United States Patent
Nakamoto et al.

(10) Patent No.: US 7,764,227 B2
(45) Date of Patent: Jul. 27, 2010

(54) POSITIONING APPARATUS

(75) Inventors: Takayoshi Nakamoto, Chiyoda-ku (JP);
Fumio Ueda, Chiyoda-ku (JP); Seiichiro Hirata, Suita (JP)

(73) Assignees: Mitsubishi Electric Corporation, Tokyo (JP); Magellan Systems Japan, Inc., Amagasaki (JP)

( * ) Notice: Subject to any disclaimer, the term of this patent is extended or adjusted under 35 U.S.C. 154(b) by 437 days.

(21) Appl. No.: 11/720,961

(22) PCT Filed: Feb. 18, 2005

(86) PCT No.: PCT/JP2005/002632

§ 371 (c)(1),
(2), (4) Date: Jun. 6, 2007

(87) PCT Pub. No.: WO2006/087811

PCT Pub. Date: Aug. 24, 2006

(65) Prior Publication Data

US 2009/0289841 A1    Nov. 26, 2009

(51) Int. Cl.
*G01S 19/25* (2010.01)
(52) U.S. Cl. .................................. 342/357.15
(58) Field of Classification Search ............. 342/357.15
See application file for complete search history.

(56) References Cited

U.S. PATENT DOCUMENTS

| | | | |
|---|---|---|---|
| 6,121,923 A * | 9/2000 | King | 342/357.12 |
| 6,133,874 A * | 10/2000 | Krasner | 342/357.15 |
| 6,289,041 B1 | 9/2001 | Krasner | |
| 6,400,753 B1 | 6/2002 | Kohli et al. | |
| 6,483,457 B2 | 11/2002 | Hirata et al. | |
| 6,525,688 B2 * | 2/2003 | Chou et al. | 342/357.06 |
| 6,577,271 B1 | 6/2003 | Gronemeyer | |
| 6,636,740 B1 * | 10/2003 | Ramesh | 455/456.1 |
| 6,646,596 B2 * | 11/2003 | Syrjarinne et al. | 342/357.15 |

FOREIGN PATENT DOCUMENTS

JP    8-240654    9/1996

(Continued)

OTHER PUBLICATIONS

E.D. Kaplan ed., "Understanding GPS: Principles and Applications", Satellite Signal Acquisition and Tracking, pp. 138-143, 1996.

*Primary Examiner*—Gregory C Issing
(74) *Attorney, Agent, or Firm*—Oblon, Spivak, McClelland, Maier & Neustadt, L.L.P.

(57) ABSTRACT

A positioning apparatus includes a correlator 30 for calculating a correlation between the pseudo pattern code of each of satellites 1 and 2 and each of SPS signals associated with the satellites 1 and 2, and for outputting a correlation value indicating the correlation, sets up effective ranges δ1 and δ2 for the correlation values outputted from the correlator 30 on the basis of a pseudo distance PR1 between the satellite 1 and a SPS reference station 4, and a pseudo distance PR2 between the satellite 2 and the SPS reference station 4, and detects peak values which fall within the effective ranges δ1 and δ2, respectively. As a result, the positioning apparatus can determine the current position correctly even under a receiving environment in which the electric waves directly from the satellites 1 and 2 may become weak.

15 Claims, 8 Drawing Sheets

FOREIGN PATENT DOCUMENTS

| | | |
|---|---|---|
| JP | 2002 518684 | 6/2002 |
| JP | 2003 57327 | 2/2003 |
| JP | 2003 98243 | 4/2003 |
| JP | 2003-139841 | 5/2003 |
| JP | 2003 523500 | 8/2003 |
| JP | 2004 515766 | 5/2004 |

* cited by examiner

POSITIONING APPARATUS

FIELD OF THE INVENTION

The present invention relates to a positioning apparatus which receives electric waves sent from, for example, a satellite positioning system (SPS: Satellite Positioning System) so as to determine a current position.

BACKGROUND OF THE INVENTION

A positioning apparatus receives electric waves sent from satellites by using an SPS receiver, and removes carriers from the electric waves so as to acquire SPS received signals. A correlator then carries out a correlation calculation by using the pseudo pattern codes of the satellites and the SPS received signals.

A data processing unit of the positioning apparatus selects the largest correlation value from correlation values outputted from the correlator, and calculates a pseudo distance between each of the satellites and the SPS receiver on the basis of a position shown by the largest one of the correlation values to determine the current position (refer to, for example, patent reference 1).

[Patent reference 1] U.S. Pat. No. 6,289,041 B1

Because the prior art positioning apparatus is constructed as mentioned above, under an environment in which the powers of the electric waves which come directly from the satellites are strong while the powers of multi-pass electric waves which come indirectly from the satellites and the noise level are weak, the current position can be determined with a high degree of precision. However, in a case in which the prior art positioning apparatus carries out positioning when it is placed the valley between buildings or indoor of a building, such a building serves as an obstruction and the powers of the electric waves which come directly from the satellites become weaker, and therefore a correlation value associated with multi-pass electric waves and extraneous noises may be maximized among the correlation values outputted by the correlator. In such a case, because the current position is determined on the basis of not the electric waves that come directly from the satellites, but the multi-pass electric waves and extraneous noises, there is a problem that the prior art positioning apparatus cannot determine the current position correctly.

The present invention is made in order to solve the above-mentioned problem, and it is therefore an object of the present invention to provide a positioning apparatus which can determine the current position correctly even under a receiving environment in which the electric waves which come directly from the satellites become weak.

DESCRIPTION OF THE INVENTION

In accordance with the present invention, there is provided a positioning apparatus including a correlation value output means for calculating correlations between the pseudo pattern codes of satellites and electric waves received by a radio wave receiving means, and for outputting correlation values indicating the correlations, the positioning apparatus setting up an effective range for each of the correlation values outputted from the correlation value output means on the basis of a pseudo distance between each of the satellites and a reference station, and detecting a peak value which falls within the effective range.

As a result, the present invention offers an advantage of being able to determine the current position correctly even under a receiving environment in which the electric waves which come directly from the satellites become weak.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
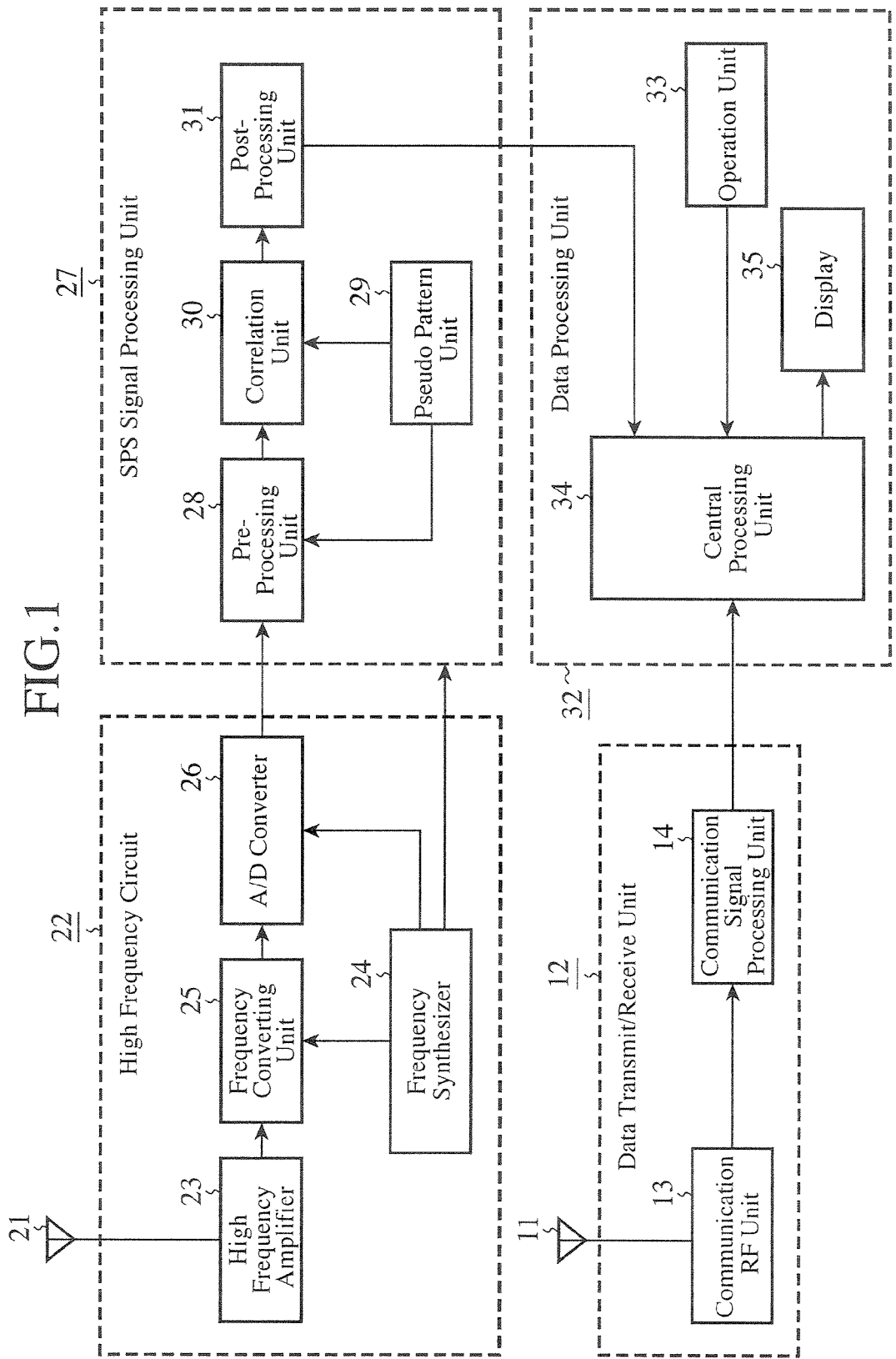
FIG. 1 is a block diagram showing a positioning apparatus in accordance with embodiment 1 of the present invention.
Figure 2:
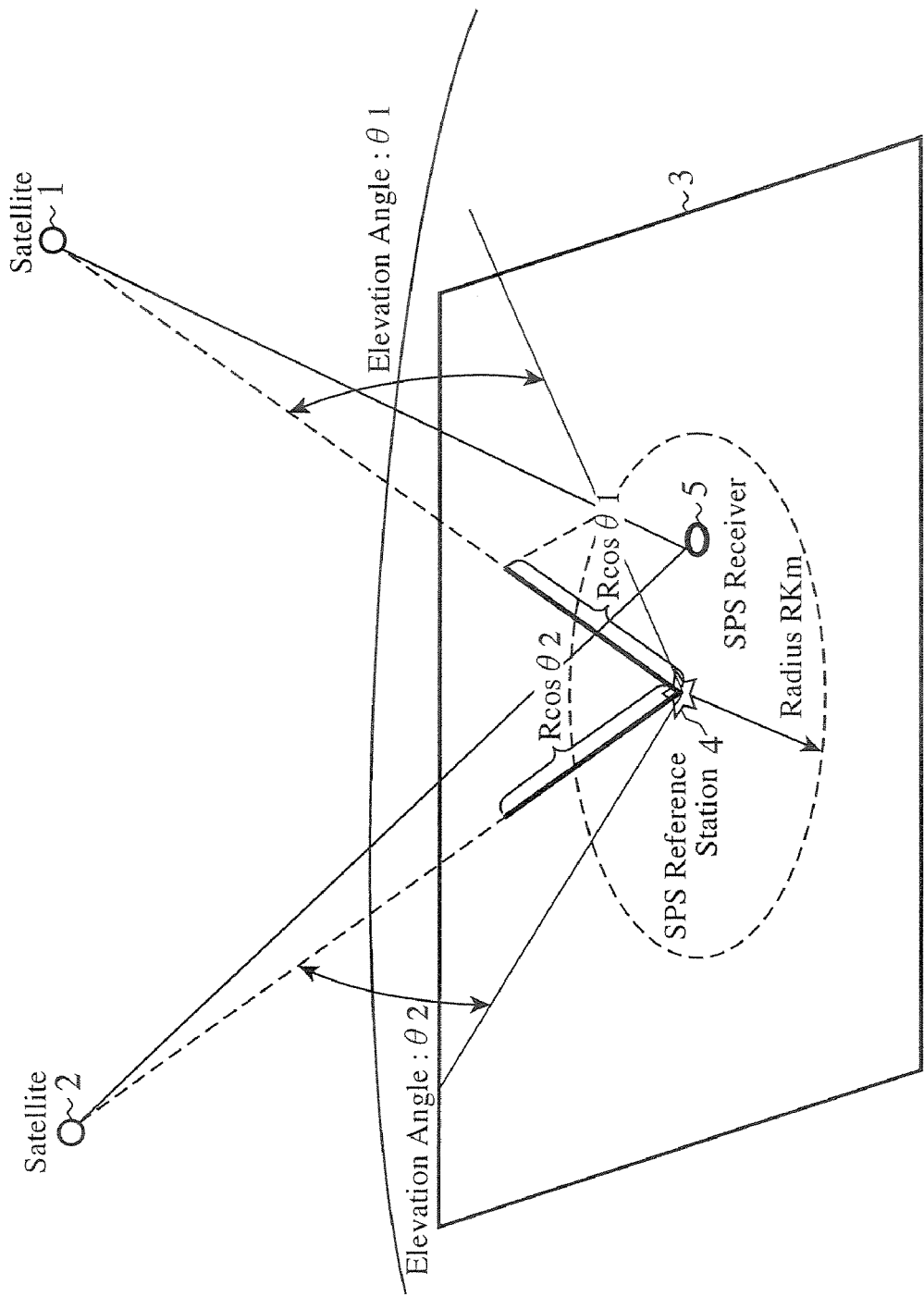
FIG. 2 is a sketch showing a positioning environment in which the positioning apparatus determines the current position thereof.

FIG. 1 is a block diagram showing a positioning apparatus in accordance with embodiment 1 of the present invention, and FIG. 2 is a sketch showing a positioning environment in which the positioning apparatus determines the current position thereof.

In the figure, each of satellites 1 and 2 includes information indicating the exact time of sending an electric wave and the current position thereof in a high frequency electric wave, and sends out this electric wave.

An SPS reference station 4 is fixed to a specific location of a ground surface 3, and receives high frequency electric waves sent from the satellites 1 and 2. The SPS reference station 4 calculates a pseudo distance PR1 between the SPS reference station itself and the satellite 1, and a pseudo distance PR2 between the SPS reference station itself and the satellite 2, and also calculates a pseudo distance difference ΔPR between the satellites 1 and 2. The SPS reference station 4 then transmits a high frequency signal indicating the pseudo distances PR1 and PR2 and the pseudo distance difference ΔPR to an SPS receiver 5.

The SPS receiver 5 is equipped with the positioning apparatus of FIG. 1, and receives high frequency electric waves sent out of the satellites 1 and 2 and also receives the high frequency signal transmitted from the SPS reference station 4. In the example of FIG. 2, the SPS receiver 5 exists in an area (for example, an area having a radius of 10 km) in which it can receive the high frequency signal transmitted from the SPS reference station 4.

A transmit/receive antenna 11 receives the high frequency signal transmitted from the SPS reference station 4.

When the transmit/receive antenna 11 receives the high frequency signal transmitted from the SPS reference station 4, a radio RF unit 13 of a data transmit/receive unit 12 down-converts the high frequency signal into an intermediate frequency signal and outputs it.

A communication signal processing unit 14 of the data transmit/receive unit 12 demodulates the intermediate frequency signal outputted from the radio RF unit 13 to extract the pseudo distances PR1 and PR2 and the pseudo distance difference ΔPR, and outputs the pseudo distances PR1 and PR2 and the pseudo distance difference ΔPR to a central processing unit 34 of a data processing unit 32.

An information receiving means is comprised of the transmit/receive antenna 11 and the data transmit/receive unit 12.

An SPS receive antenna 21 receives the high frequency electric waves (including time information and position information) sent out of the satellites 1 and 2.

A high frequency amplifier 23 of a high frequency circuit 22 amplifies the high frequency electric waves received by the SPS receive antenna 21.

A frequency synthesizer 24 of the high frequency circuit 22 generates a carrier frequency for each of the electric waves sent out of the satellites 1 and 2.

A frequency converting unit 25 of the high frequency circuit 22 removes the carrier from each of the electric waves so as to demodulate each of the electric waves by multiplying each of the electric waves amplified by the high frequency amplifier 23 by the carrier frequency generated by the frequency synthesizer 24.

Because a frequency error caused by a Doppler phenomenon is included in the frequency of each of the electric waves amplified by the high frequency amplifier 23, the frequency converting unit 25 detects the frequency error, and also carries out a process of compensating for the frequency error of the SPS signal.

An A/D converter 26 of the high frequency circuit 22 converts the analog SPS signal which is the demodulation signal outputted from the frequency converting unit 25 into a digital SPS signal.

A radio wave receiving means is comprised of the SPS receive antenna 21 and the high frequency circuit 22.

A pre-processing unit 28 of an SPS signal processing unit 27 adds the SPS signal outputted from the high frequency circuit 22 for every period of the pseudo pattern code.

A pseudo pattern unit 29 of the SPS signal processing unit 27 creates the pseudo pattern codes of the satellites 1 and 2 every time when the frequency synthesizer 24 generates the carrier frequency.

A correlator 30 of the SPS signal processing unit 27 calculates a correlation between each of the pseudo pattern codes created by the pseudo pattern unit 29 and the SPS signal on which the addition process is performed by the pre-processing unit 28, and outputs a correlation value indicating the correlation.

A post-processing unit 31 of the SPS signal processing unit 27 adds the correlation value outputted from the correlator 30 for every data modulation period.

The SPS signal processing unit 27 constructs a correlation value output means.

An operation unit 33 of the data processing unit 32 is provided with a function of receiving an operation by the user.

The central processing unit 34 of the data processing unit 32 sets up effective ranges δ1 and δ2 for the correlation values outputted from the SPS signal processing unit 27 on the basis of the pseudo distance PR1 between the satellite 1 and the SPS reference station 4 and the pseudo distance PR2 between the satellite 2 and the SPS reference station 4, which are outputted from the data transmit/receive unit 12, and detects peak values which fall within the effective ranges δ1 and δ2, respectively. At that time, when two or more peak values exist in each of the effective ranges δ1 and δ2, the central processing unit 34 selects a peak value corresponding to the pseudo distance difference ΔPR between the satellites 1 and 2 outputted from the data transmit/receive unit 12. The central processing unit 34 determines the current position from the detected peak values.

A display unit 35 of the data processing unit 32 is comprised of a liquid crystal display, and displays the current position which is determined by the central processing unit 34, the operation of the operation unit 33, etc.

The data processing unit 32 constructs a peak value detection means and a positioning means.

Next, the operation of the positioning apparatus in accordance with this embodiment of the present invention will be explained.

Each of the satellites 1 and 2 includes information indicating the exact time and its current position when sending a high frequency electric wave in the high frequency electric wave, and sends out it.

When receiving the high frequency electric waves sent from the satellites 1 and 2, the SPS reference station 4 demodulates each of them so as to extract the time information included in the electric wave to grasp the transmission time when the electric wave was sent out by the corresponding satellite, and also grasps the time of the reception of the electric wave.

When grasping the time difference ΔT1 between the transmission time and receipt time of the electric wave from the satellite 1, and the time difference ΔT2 between the transmission time and receipt time of the electric wave from the satellite 2, the SPS reference station 4 calculates a pseudo distance PR1 from the SPS reference station 4 to the satellite 1 from the time difference ΔT1 and a pseudo distance PR2 from the SPS reference station 4 to the satellite 2 from the time difference ΔT2.

$$\text{Pseudo distance } PR1 = \text{velocity-of-light} \times \text{time difference } \Delta T1$$

$$\text{Pseudo distance } PR2 = \text{velocity-of-light} \times \text{time difference } \Delta T2$$

Assume that the velocity of light is preset.

Figure 3:
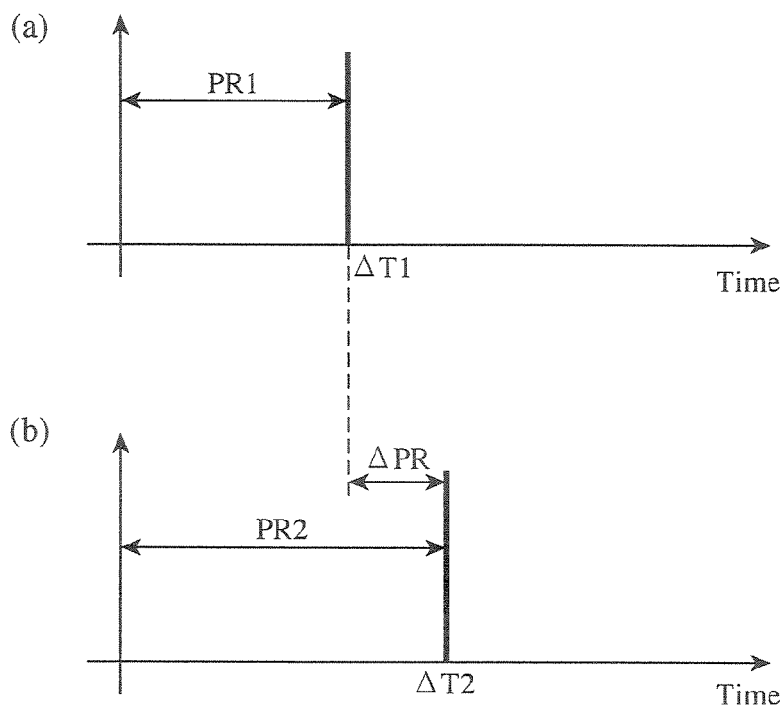
FIG. 3(a) is an explanatory diagram showing a pseudo distance PR1 from an SPS reference station 4 to a satellite 1.
FIG. 3(b) is an explanatory diagram showing a pseudo distance PR2 from the SPS reference station 4 to a satellite 2.

FIG. 3(*a*) shows the pseudo distance PR1 from the SPS reference station 4 to the satellite 1, and FIG. 3(*b*) shows the pseudo distance PR2 from the SPS reference station 4 to the satellite 2.

When calculating the pseudo distance PR1 from the SPS reference station 4 to the satellite 1 and the pseudo distance PR2 from the SPS reference station 4 to the satellite 2, as mentioned above, the SPS reference station 4 calculates a pseudo distance difference ΔPR between the satellites 1 and 2, as shown in FIG. 3.

Pseudo distance difference ΔPR=pseudo distance PR1−pseudo distance PR2

When calculating the pseudo distance difference ΔPR between the satellites 1 and 2, the SPS reference station 4 includes the pseudo distances PR1 and PR2 and the pseudo distance difference ΔPR in a high frequency signal, and transmits the high frequency signal to the SPS receiver 5.

The transmit/receive antenna 11 of the positioning apparatus mounted in the SPS receiver 5 receives the high frequency signal transmitted from the SPS reference station 4.

When the transmit/receive antenna 11 receives the high frequency signal transmitted from the SPS reference station 4, the radio RF unit 13 of the data transmit/receive unit 12 down-converts the high frequency signal, and then outputs an intermediate frequency signal.

When receiving the intermediate frequency signal from the radio RF unit 13, the communication signal processing unit 14 of the data transmit/receive unit 12 demodulates the intermediate frequency signal so as to extract the pseudo distances PR1 and PR2 and the pseudo distance difference ΔPR from the intermediate frequency signal, and outputs the pseudo distances PR1 and PR2 and the pseudo distance difference ΔPR to the central processing unit 34 of the data processing unit 32.

The SPS receive antenna 21 of the positioning apparatus also receives the high frequency electric waves (each including time information and position information) sent out of the satellites 1 and 2, like the SPS reference station 4.

When the SPS receive antenna 21 receives the high frequency electric waves sent out of the satellites 1 and 2, the high frequency amplifier 23 of the high frequency circuit 22 amplifies the high frequency electric waves.

The frequency synthesizer 24 of the high frequency circuit 22 generates a carrier frequency for each of the electric waves sent out of the satellites 1 and 2 in synchronization with, for example, a clock, and outputs the carrier frequency to the frequency converting unit 25.

When receiving the carrier frequency from the frequency synthesizer 24, the frequency converting unit 25 of the high frequency circuit 22 removes the carrier from each of the electric waves by multiplying each of the electric waves amplified by the high frequency amplifier 23 by the corresponding carrier frequency so as to demodulate each of the electric waves.

Because a frequency error caused by the Doppler phenomenon is included in the frequency of each of the electric waves amplified by the high frequency amplifier 23, the frequency converting unit 25 detects the frequency error and also carries out a process of compensating for the frequency error of the SPS signal.

A method of detecting and compensating for the frequency error is not limited to a specific one, and, for example, a method disclosed by the following nonpatent reference can be used.

Nonpatent Reference

E. D. Kaplan ed. Understanding GPS Principles and Application, Artech house, Inc. 1996, Norwood. pp. 139-142

When receiving the analog SPS signal which is the demodulation signal from the frequency converting unit 25, the A/D converter unit 26 of the high frequency circuit 22 A/D converts the SPS signal into a digital SPS signal, and then outputs the digital SPS signal to the pre-processing unit 28 of the SPS signal processing unit 27.

The pseudo pattern unit 29 of the SPS signal processing unit 27 creates the pseudo pattern codes of the satellites 1 and 2 every time when the frequency synthesizer 24 generates the carrier frequencies.

When receiving the digital SPS signal from the high frequency circuit 22, the pre-processing unit 28 of the SPS signal processing unit 27 performs an addition process on the SPS signal for every period of each of the pseudo pattern codes.

When receiving the pseudo pattern codes of the satellites 1 and 2 from the pseudo pattern unit 29, the correlator 30 of the SPS signal processing unit 27 calculates a correlation between each of the pseudo pattern code of the satellites 1 and 2 and the SPS signal on which the addition process is performed by the pre-processing unit 28, and outputs a correlation value indicating the correlation to the post-processing unit 31.

FIG. 4(a) shows the correlation value of the SPS signal associated with the satellite 1, and FIG. 4(b) shows the correlation value of the SPS signal associated with the satellite 2.

The post-processing unit 31 of the SPS signal processing unit 27 adds each of the correlation values outputted from the correlator 30 for every data modulation period.

The central processing unit 34 of the data processing unit 32 sets up effective ranges δ1 and δ2 for the correlation values outputted from the SPS signal processing unit 27 on the basis of the pseudo distance PR1 between the satellite 1 and the SPS reference station 4 and the pseudo distance PR2 between the satellite 2 and the SPS reference station 4, which are outputted from the data transmit/receive unit 12.

If neither multi-pass electric waves nor extraneous noises reach the positioning apparatus and only the electric waves reach the positioning apparatus directly from the satellites 1 and 2, each of the correlation values has only one peak value. In contrast, if multi-pass electric waves or extraneous noises reach the positioning apparatus, each of the correlation values may include two or more peak values under the influence of the multi-pass electric waves or the extraneous noises, as shown in FIGS. 4(a) and 4(b). In such a case, if simply selecting a maximum peak value so as to determine the current position, the positioning apparatus may determine the current position on the basis of peak values associated with the multi-pass electric waves or the extraneous noises.

Therefore, in order to be able to certainly select a peak value associated with the electric wave which comes directly from each of the satellites 1 and 2, and to determine the current position, the central processing unit 34 sets up the effective ranges δ1 and δ2 for the correlation values, respectively.

To be more specific, the central processing unit sets up the effective ranges δ1 and δ2 for the correlation values, respectively, as follows.

In contrast to the distance between the SPS receiver 5 equipped with the positioning apparatus, and each of the satellites 1 and 2 is about 20,000 km, the distance between the SPS receiver 5 and the SPS reference station 4 is about 10 km and is sufficiently short as compared with the distance from the SPS receiver 5 to each of the satellites 1 and 2.

Therefore, it can be assumed that the pseudo distance PRa1 from the SPS receiver 5 to the satellite 1 is almost the same as the pseudo distance PR1 from the SPS reference station 4 to the satellite 1 (i.e., PRa1≈PR1).

Similarly, it can be assumed that the pseudo distance PRa2 from the SPS receiver 5 to the satellite 2 is almost the same as the pseudo distance PR2 from the SPS reference station 4 to the satellite 2 (i.e., PRa2≈PR2).

Therefore, because it can be assumed that time differences which correspond to the pseudo distance PRa1 from the SPS receiver 5 to the satellite 1 and the pseudo distance PRa2 from the SPS receiver 5 to the satellite 2, respectively (i.e., a time difference between the transmission time and reception time of the electric wave sent out of the satellite 1 and a time difference between the transmission time and reception time of the electric wave sent out of the satellite 2) are almost the same as the time differences $\Delta T1$ and $\Delta T2$ which correspond to the pseudo distances PR1 and PR2, respectively, it can be assumed that peak values which exist in the vicinity of the time differences $\Delta T1$ and $\Delta T2$ are the peak values associated with the electric waves which have come directly from the satellites 1 and 2, respectively. In other words, it can be assumed that peak values which do not exist in the vicinity of the time differences $\Delta T1$ and $\Delta T2$, respectively are associated with the multi-pass electric waves or the extraneous noises.

Figure 4:
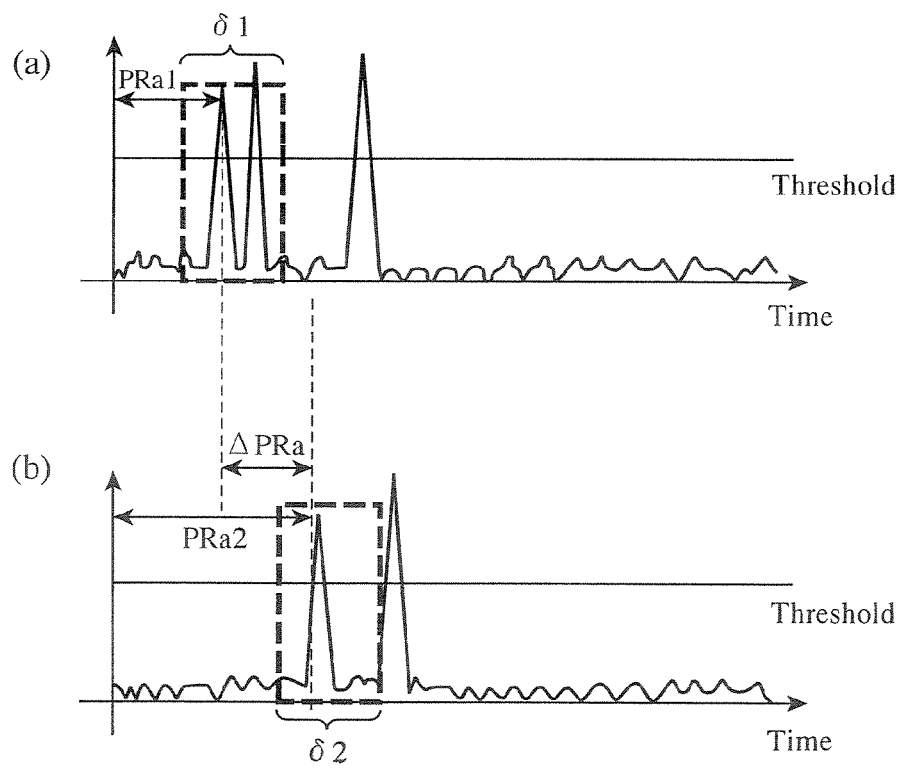
FIG. 4(a) is an explanatory diagram showing a correlation value of an SPS signal associated with the satellite 1.
FIG. 4(b) is an explanatory diagram showing a correlation value of an SPS signal associated with the satellite 2.

Therefore, as shown in FIG. 4(*a*), the central processing unit 34 defines, as the effective range $\delta 1$ for the correlation value associated with the satellite 1, a predetermined range whose center is placed at the time difference $\Delta T1$ which corresponds to the pseudo distance PR1 from the SPS reference station 4 to the satellite 1.

Similarly, as shown in FIG. 4(*b*), the central processing unit 34 defines, as the effective range $\delta 2$ for the correlation value associated with the satellite 2, a predetermined range whose center is placed at the time difference $\Delta T2$ which corresponds to the pseudo distance PR2 from the SPS reference station 4 to the satellite 2.

After setting the effective ranges $\delta 1$ and $\delta 2$ for the correlation values, as mentioned above, the central processing unit 34 detects peak values which fall within the effective ranges $\delta 1$ and $\delta 2$, respectively.

Because, in the example of FIG. 4(*b*), only one peak value of the correlation value of the SPS signal associated with the satellite 2 exists within the effective range $\delta 2$, the central processing unit only has to detect the peak value which falls within the effective range $\delta 2$. In contrast, in the example of FIG. 4(*a*), two peak values of the correlation value of the SPS signal associated with the satellite 1 exist within the effective range $\delta 1$.

Because it is clear that only one of them is associated with the electric wave which has come directly from the satellite 1 even if the two peak values exist within the effective range $\delta 1$, the two peak values include a peak value associated with the multi-pass electric waves or the extraneous noises.

Therefore, the central processing unit needs to select a peak value associated with the electric wave which has come directly from the satellite 1 from the two or more peak values which fall within the effective range $\delta 1$. In this case, it can be assumed that the pseudo distance difference $\Delta PRa$ calculated from the pseudo distances PRa1 and PRa2 is almost the same as the pseudo distance difference $\Delta PR$ calculated from the pseudo distances PR1 and PR2, the central processing unit selects a peak value which falls with the effective range $\delta 1$ and which is the pseudo distance difference $\Delta PR$ ($\approx \Delta PRa$) (i.e., a peak value which corresponds to the pseudo distance PRa1) away from the peak value which falls with the effective range $\delta 2$ (i.e., a peak value which corresponds to the pseudo distance PRa2). In the example of FIG. 4(*a*), the central processing unit selects the peak value on the left-hand side.

For the sake of simplicity, assume that the positioning apparatus receives electric waves sent out of the two satellites 1 and 2, and then detects peak values for them, respectively. However, in order to determine the current position thereof, the positioning apparatus needs to receive simultaneously electric waves sent out of three or four satellites, and then detects peak values for them, respectively.

When detecting the peak values which fall within the effective ranges $\delta 1$ and $\delta 2$, respectively, as mentioned above, the central processing unit 34 determines the current position from these peak values.

More specifically, because each of these peak values includes position information on the corresponding satellite, the central processing unit 34 determines the current position of the SPS receiver 5 by using, for example, a triangulation technique.

Because a known technique only has to be used for implementing the method of determining the current position, the detailed explanation of the method will be omitted hereafter.

When determining the current position of the SPS receiver 5, the central processing unit 34 displays the current position on the display unit 35.

As can be seen from the above description, the positioning apparatus in accordance with this embodiment 1 includes the correlator 30 which calculates correlations between the pseudo pattern codes of the satellites 1 and 2, and the SPS signals associated with the satellites 1 and 2, and which outputs correlation values indicating the correlations, sets up effective ranges $\delta 1$ and $\delta 2$ for the correlation values outputted from the correlator 30 on the basis of the pseudo distance PR1 between the satellite 1 and the SPS reference station 4 and the pseudo distance PR2 between the satellite 2 and the SPS reference station 4, and detects peak values which fall within the effective ranges $\delta 1$ and $\delta 2$, respectively. Therefore, the present embodiment offers an advantage of being able to determine the current position correctly even under a receiving environment in which the electric waves which come directly from the satellites 1 and 2 become weak.

Furthermore, in accordance with this embodiment 1, when two or more peak values exists in either or both of the effective ranges $\delta 1$ and $\delta 2$, the positioning apparatus selects a peak value corresponding to the pseudo distance difference $\Delta PR$ between the satellites 1 and 2 from the two or more peaks. Therefore, even when two or more peak values exists in either or both of the effective ranges $\delta 1$ and $\delta 2$, the positioning apparatus can select certainly a peak value associated with the electric wave which come directly from each of the satellites 1 and 2.

In this embodiment 1, the positioning apparatus receives the pseudo distances PR1 and PR2 and the pseudo distance difference $\Delta PR$ from the SPS reference station 4, as previously mentioned. As for the pseudo distance difference $\Delta PR$, the central processing unit 34 can calculate from the pseudo distances PR1 and PR2, for example, without receiving the pseudo distance difference $\Delta PR$ from the SPS reference station 4.

The SPS reference station 4 can alternatively transmit the pseudo distances PR1 and PR2 and the pseudo distance difference $\Delta PR$ to another apparatus (for example, a base station), and the other apparatus can transfer the pseudo distances PR1 and PR2 and the pseudo distance difference $\Delta PR$ to the SPS receiver 5.

In this embodiment 1, the positioning apparatus receives electric waves sent out of the SPS satellites 1 and 2, and determines the current position thereof, as previously mentioned. As an alternative, the positioning apparatus can receive electric waves sent out of GPS (Global Positioning System) satellites 1 and 2, and determine the current position thereof. In this case, the same advantage can be provided.

In this embodiment 1, when two or more peak values exist in either or both of the effective ranges $\delta 1$ and $\delta 2$, the central processing unit 34 selects a peak value corresponding to the pseudo distance difference ΔPR between the satellites 1 and 2 from the two or more peak values, as previously mentioned. The method of selecting a peak value is not limited to this one, and the following method of selecting a peak value can be alternatively used.

Figure 5:
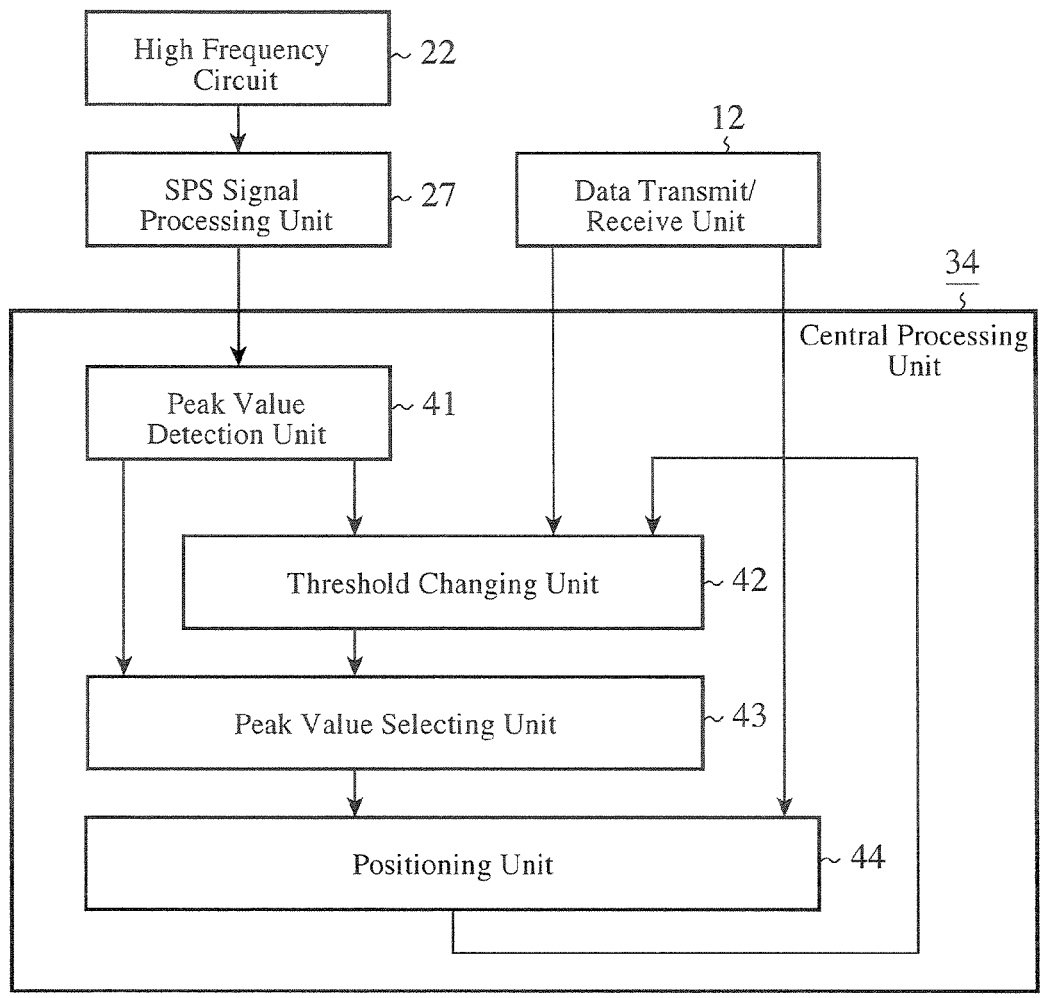
FIG. 5 is a block diagram showing the internal structure of a central processing unit 34.

FIG. 5 is a block diagram showing the internal structure of the central processing unit 34. In the figure, the peak value detection unit 41 compares a correlation value which falls within each of the effective ranges δ1 and δ2 with a given threshold which is set up beforehand, and detects a correlation value larger than the threshold as a peak value.

When the peak value detection unit 41 detects two or more peak values, the threshold changing unit 42 changes the threshold which is set up beforehand. The threshold changing unit 42 performs iteratly the changing process until the peak value selecting unit 43 selects only one peak value.

The peak value selecting unit 43 compares the two or more peak values detected by the peak value detection unit 41 with the threshold which has been changed by the threshold changing unit 42, and selects a peak value larger than the changed threshold from the two or more peak values.

The positioning unit 44 determines the current position from the peak value selected by the peak value selecting unit 43.

Next, the operation of the central processing unit 34 of FIG. 5 will be explained.

Figure 6:
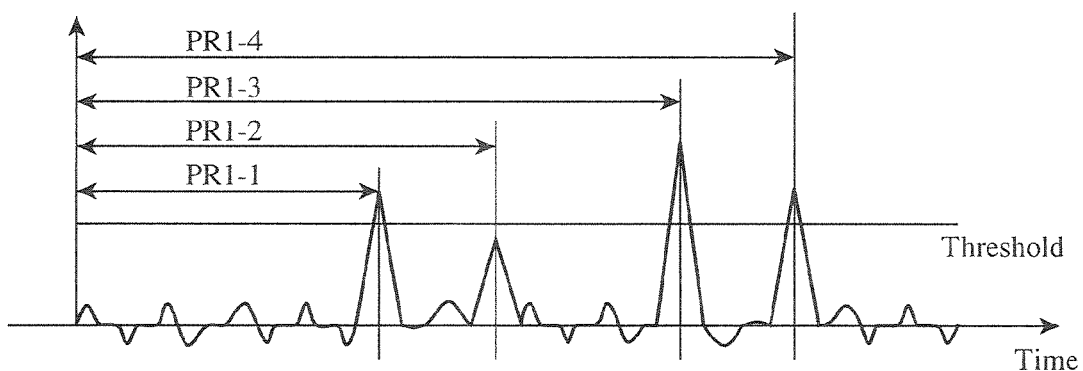
FIG. 6 is an explanatory diagram showing a threshold which has not been changed, and correlation values which fall within an effective range.

When receiving the correlation value which falls within each effective range from the post-processing unit 31 of the SPS signal processing unit 27, the peak value detection unit 41 of the central processing unit 34 compares the correlation value with the given threshold which is set up beforehand, as shown in FIG. 6, and detects a correlation value larger than the threshold as a peak value.

In the example of FIG. 6, the peak value detection unit detects three peak values.

The threshold changing unit 42 of the central processing unit 34 changes the threshold which is set up beforehand when the peak value detection unit 41 detects two or more peak values.

In the example of FIG. 6, because three peak values are detected, the threshold changing unit increases the threshold which is set up beforehand in order to narrow down the number of peak values detected from three to one.

At that time, because there is a high possibility that the current position currently determined by the positioning unit 44 is not much away from the current position previously determined by the positioning unit 44, the threshold changing unit 42 changes the threshold to a value which is close to a correlation value associated with the current position previously determined by the positioning unit 44.

For example, the threshold changing unit 42 calculates the changed threshold according to the following equation: the changed threshold=the correlation value associated with the current position previously determined×0.8.

The threshold changing unit 42 iteratly carries out the changing process until the peak value selecting unit 43 which will be mentioned later selects only one peak value.

Figure 7:
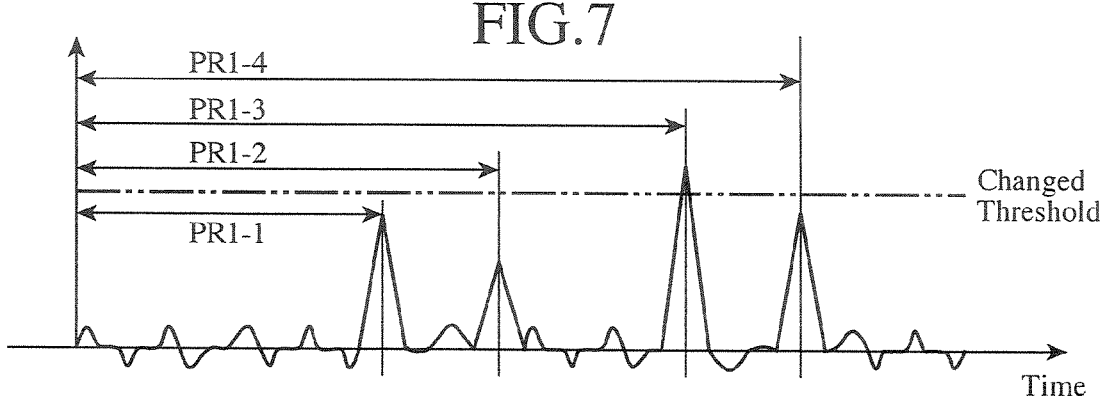
FIG. 7 is an explanatory diagram showing the threshold which has been changed, and correlation values which fall within the effective range.

When the threshold changing unit 42 changes the threshold, as shown in FIG. 7, the peak value selecting unit 43 of the central processing unit 34 compares the two or more peak values detected by the peak value detection unit 41 with the threshold which has been changed by the threshold changing unit 42, and selects a peak value larger than the changed threshold.

In the example of FIG. 7, the peak value selecting unit selects one peak value.

When the peak value selecting unit 43 selects one peak value, the positioning unit 44 determines the current position from the peak value.

As can be seen from the above description, the positioning apparatus in accordance with this embodiment 1 is so constructed as to, when two or more peak values exist in either or both of the effective ranges, change the threshold to detect the largest peak value. Therefore, even when two or more peak values exist in either or both of the effective ranges, the positioning apparatus can select certainly peak values respectively associated with the electric waves which come directly from the satellites 1 and 2.

Embodiment 2

In accordance with above-mentioned embodiment 1, the central processing unit 34 of the data processing unit 32 sets up effective ranges δ for the correlation values outputted from the SPS signal processing unit 27 on the basis of the pseudo distances PR1 and PR2 between the satellites 1 and 2 and the SPS reference station 4 which are outputted from the data transmit/receive unit 12, as previously shown. As an alternative, the operation unit 33 which constructs the change receiving means receives a change in each of the effective ranges δ for the correlation values, which are set up by the central processing unit 34, and allows the user to change the effective ranges δ1 and δ2 to desired values.

Figure 8:
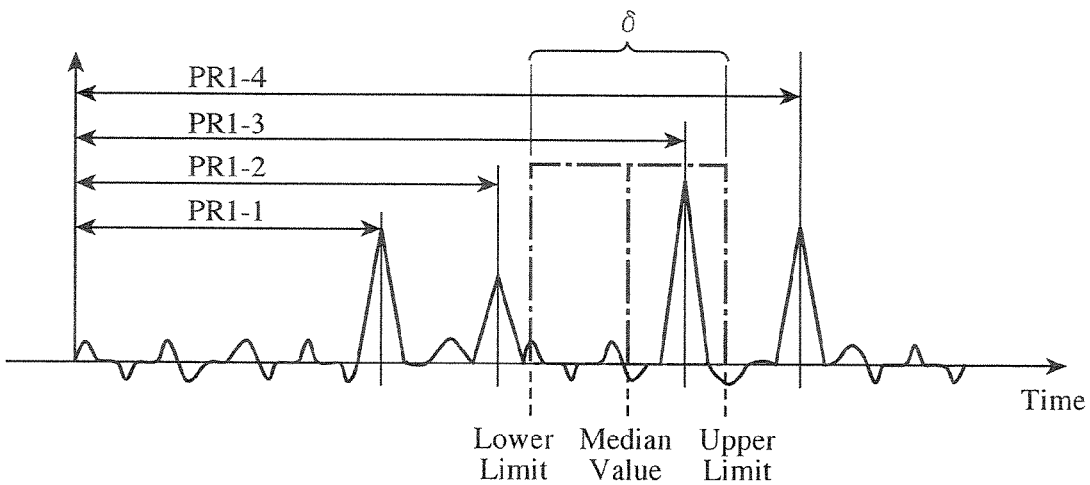
FIG. 8 is an explanatory diagram showing the effective range which has not been changed.
Figure 9:
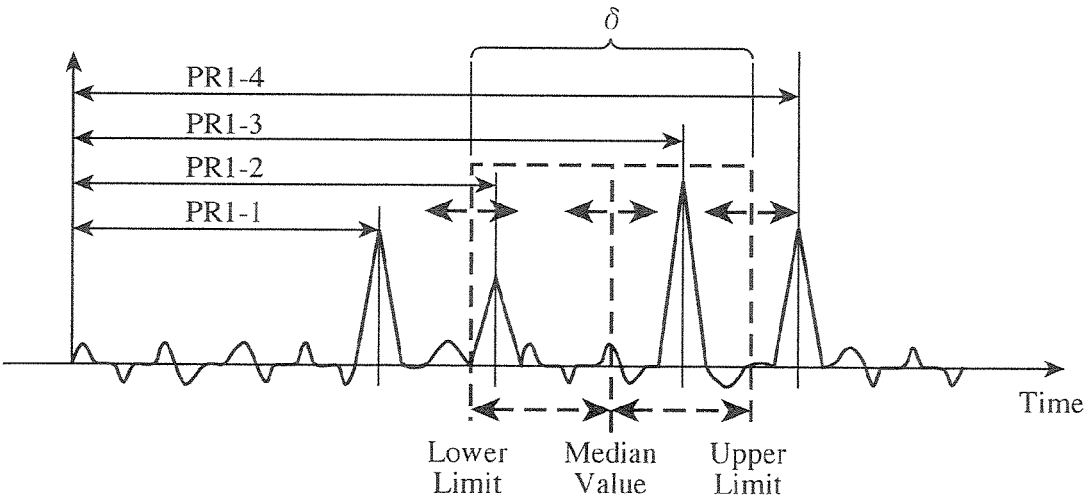
FIG. 9 is an explanatory diagram showing the effective range which has been changed.

For example, in a case in which the central processing unit 34 of the data processing unit 32 sets up an effective range δ for a correlation value, as shown in FIG. 8, when the user operates the operation unit 33 to input a change command for changing the lower limit, median value, or upper limit of the effective range δ, the central processing unit 34 changes the effective range δ according to the change command, as shown in FIG. 9.

Therefore, this embodiment offers an advantage of enabling the user to customize the positioning conditions of the positioning apparatus.

Embodiment 3

The positioning apparatus in accordance with above-mentioned embodiment 1 detects peak values which fall within the effective ranges δ1 and δ2 for the correlation values, respectively, as previously shown.

The central processing unit 34 can substitute, as parameters, the pseudo distances between the satellites and the SPS reference station 4 and a pseudo distance based on a detection candidate's peak value into an evaluation equation, change the parameters until the evaluation equation is established, and detect peak values which fall with the effective ranges, respectively.

Figure 10:
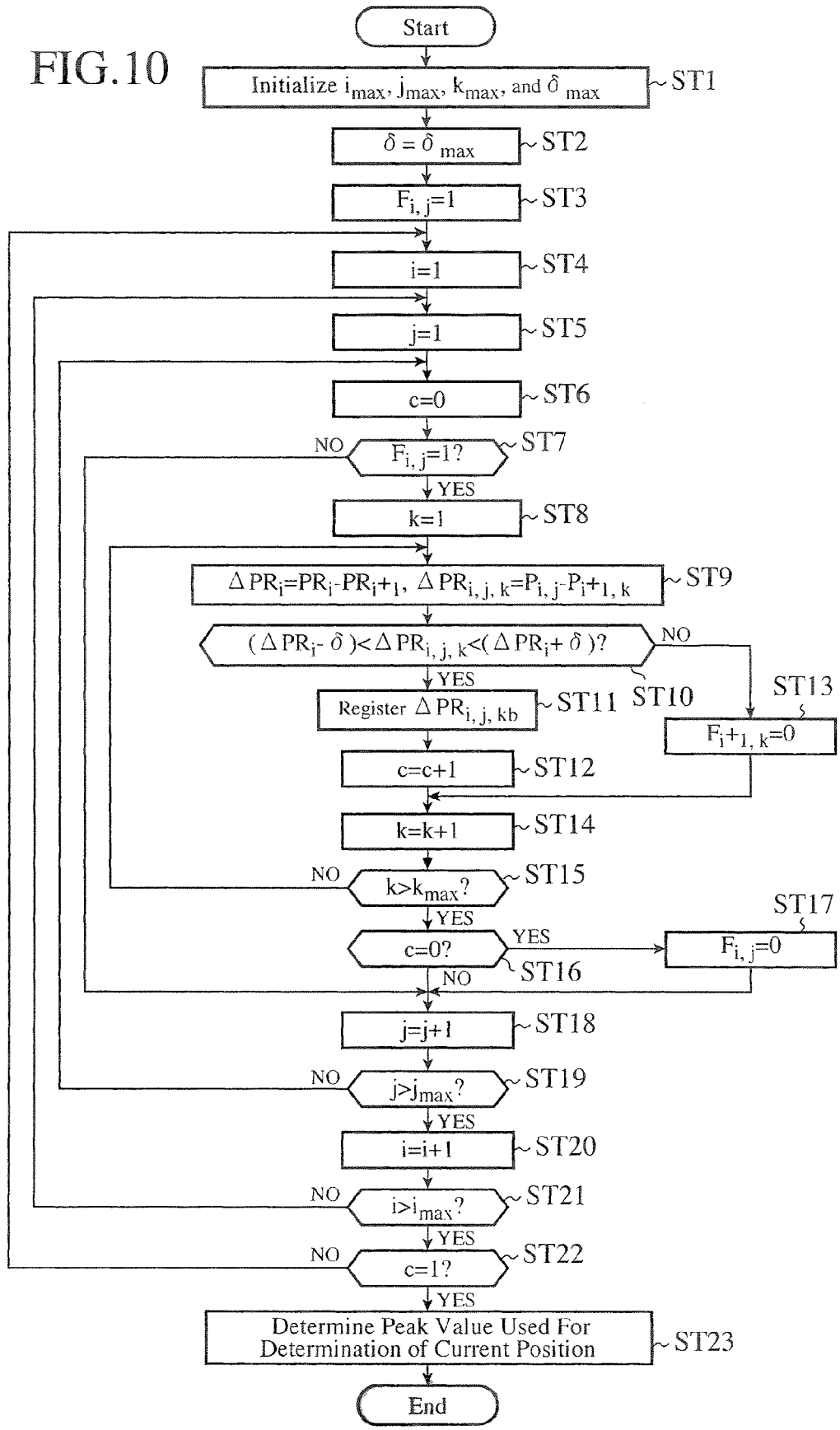
FIG. 10 is a flow chart showing a process of detecting a peak value which falls within the effective range.

FIG. 10 is a flow chart showing a process of detecting peak values which fall with the effective ranges, respectively.

Concretely, the central processing unit detects peak values which fall with the effective ranges, respectively, as follows.

First, the central processing unit 34 initializes the number of satellites to $i_{max}$, the number of peak values of each correlation value outputted from the correlator 30 to $j_{max}$, the number of combinations of two adjacent satellites to $k_{max}$, and a maximum of each effective range to $\delta_{max}$ (step ST1).

The user can set up these numbers, the maximum, and so on properly by operating the operation unit 33.

Next, the central processing unit 34 sets the effective range δ for each correlation value to the maximum $\delta_{max}$ (step ST2), and initializes a flag $F_{i,j}$ to "1" (step ST3).

The central processing unit 34 also initializes a variable i showing a certain satellite to "1", initializes a variable j showing a peak value of each correlation value to "1", and initializes a counter c showing the number of registered pseudo distance differences $\Delta PR_{i,j,k}$ to "0" (steps ST4, ST5, and ST6).

After completing the above-mentioned initialization processing, the central processing unit 34 judges whether or not the flag $F_{i,j}$ is set to "1" (step ST7). At this stage, in step ST3, because the flag $F_{i,j}$ is initialized to "1", the central processing unit judges that the flag $F_{i,j}$ is "1", and shifts to a process of step ST8.

In contrast, when judging that the flag $F_{i,j}$ is not "1", the central processing unit shifts to a process of step ST18 in order to change the peak value to be processed.

Next, after setting a variable k indicating a combination of adjacent satellites to "1" (step ST8), the central processing unit 34 calculates the pseudo distance difference $\Delta PR_i$ between the pseudo distance $PR_i$ from the SPS reference station 4 to the satellite i and the pseudo distance PRi+1 from the SPS reference station 4 to the satellite i+1.

The central processing unit 34 further calculates the pseudo distance difference $\Delta PR_{i,j,k}$ between the pseudo distance $PR_{i,j}$ from the SPS receiver 5 to the satellite i, which is based on the peak value j associated with the satellite i, and the pseudo distance $PR_{i+1,k}$ from the SPS receiver 5 to the satellite i+1, which is based on the peak value k associated with the satellite i+1 (step ST9).

The central processing unit 34 judges whether or not an evaluation equation which will be mentioned below is established by substituting the above-mentioned pseudo distance difference $\Delta PR_i$, the above-mentioned pseudo distance difference $\Delta PR_{i,j,k}$, and the effective range δ set up in step ST2 into the evaluation equation (step ST10).

$$(\Delta PR_i-\delta) < \Delta PR_{i,j,k} < (\Delta PR_i+\delta)$$

When the above-mentioned evaluation equation is established, the central processing unit 34 determines that the pseudo distance difference $\Delta PR_{i,j,k}$ is acquired from true pseudo distances, and registers the pseudo distance difference $\Delta PR_{i,j,k}$ (step ST11), and increments the counter c by 1 (step ST12).

In contrast, when the above-mentioned evaluation equation is not established, the central processing unit initializes the flag $F_{i+1,k}$ to "0" in order to make the next candidate for the combination of adjacent satellites become the target for the processing (step ST13).

Next, the central processing unit 34 increments the variable k indicating the combination of adjacent satellites by 1 in order to make the next candidate for the combination of adjacent satellites become the target for the processing (step ST14), and judges whether the variable k exceeds the number $k_{max}$ of combinations of adjacent satellites (step ST15).

When the variable k does not exceed the number $k_{max}$ of combinations of adjacent satellites, the central processing unit 34 returns to the process of step ST9 and performs the processes of steps ST9 to ST14 again.

In contrast, when the variable k exceeds the number $k_{max}$ of combinations of adjacent satellites, the central processing unit shifts to a process of step ST16.

When the variable k exceeds the number $k_{max}$ of combinations of adjacent satellites, the central processing unit 34 judges whether or not the counter c indicating the number of registrations of the pseudo distance difference $\Delta PR_{i,j,k}$ is "0" (step ST16).

Unless the counter c is "0", the central processing unit shifts to a process of step ST18, whereas if the counter c is "0", after changing the flag $F_{i,j}$ which is initialized in step ST3 to "0" (step ST17), the central processing unit shifts to the process of step ST18.

Next, in order to change the peak value to be processed, the central processing unit 34 increments the variable j indicating the peak value by 1 (step ST18), and judges whether the variable j exceeds the number $j_{max}$ of peak values (step ST19).

When the variable j does not exceed the number $j_{max}$ of peak values, the central processing unit 34 returns to the process of step ST6, and performs the processes of steps ST6 to ST18 again.

In contrast, when the variable j exceeds the number $j_{max}$ of peak values, the central processing unit shifts to a process of step ST20.

Next, in order to change the satellite to be processed, the central processing unit 34 increments the variable i indicating the satellite by 1 (step ST20), and judges whether the variable i exceeds the number $i_{max}$ of satellites (step ST21).

When the variable i does not exceed the number $i_{max}$ of satellites, the central processing unit 34 returns to the process of step ST5, and performs the processes of steps ST5 to ST20 again.

In contrast, when the variable i exceeds the number $i_{max}$ of satellites, the central processing unit shifts to a process of step ST22.

When the variable i exceeds the number $i_{max}$ of satellites, the central processing unit 34 judges whether or not the counter c indicating the number of registrations of the pseudo distance difference $\Delta PR_{i,j,k}$ is "1" (step ST22).

When the counter c is "1", the central processing unit 34 certifies that the pseudo distance difference $\Delta PR_{i,j,k}$ which is registered has been acquired from true pseudo distances.

When certifying that the pseudo distance difference $\Delta PR_{i,j,k}$ has been acquired from true pseudo distances, the central processing unit 34 determines the peak value j associated with the pseudo distance difference $\Delta PR_{i,j,k}$ as the peak value which is used for determining the current position (step ST23).

In contrast, when the counter c is "0", the central processing unit returns to the process of step ST4 because no pseudo distance difference $\Delta PR_{i,j,k}$ is registered.

When the counter c is "2" or larger, the central processing unit returns to the process of step ST4 because a peak value associated with multi-pass electric waves or extraneous noises is included.

As can be seen from the above description, in accordance with this embodiment 3, the central processing unit 34 substitutes the pseudo distance between each satellite and the SPS reference station 4 and a pseudo distance based on a detection candidate's peak value into the evaluation equation as parameters, changes the parameters until the evaluation equation is established, and detects a peak value which falls within each effective range. Therefore, the positioning apparatus can select a peak value associated with an electric wave which comes directly from each satellite with a high degree of precision.

Embodiment 4

In accordance with either of above-mentioned embodiments 1 to 3, the positioning apparatus detects a peak value which falls within each effective range, as previously mentioned. To be more specific, the positioning apparatus detects, as the peak value, a correlation value larger than a predetermined noise level (i.e., a threshold) from among the correlation values outputted from the correlator 30.

In accordance with this embodiment 4, the central processing unit 34 calculates the threshold as follows.

More specifically, when each of the correlation values outputted from the correlator 30 includes, for example, data about 1,000 samples, the central processing unit 34 removes data about samples each having a value equal to the peak value plus or minus 10 from the data about 1,000 samples, and calculates an average and a standard deviation value of the data from which the data about samples having a value equal to the peak value plus or minus 10 are removed.

The central processing unit 34 then adds the average and standard deviation value of the data, and uses an addition result as the threshold.

As can be seen from the above description, the positioning apparatus in accordance with this embodiment 4 calculates a threshold from each of the correlation values outputted from correlator 30, and detects a correlation value larger than the threshold as a peak value. Therefore, even if a receiving environment in which the positioning apparatus receives noises varies, the positioning apparatus can select a peak value associated with an electric wave which comes directly from each satellite with a high degree of precision.

Embodiment 5

Figure 11:
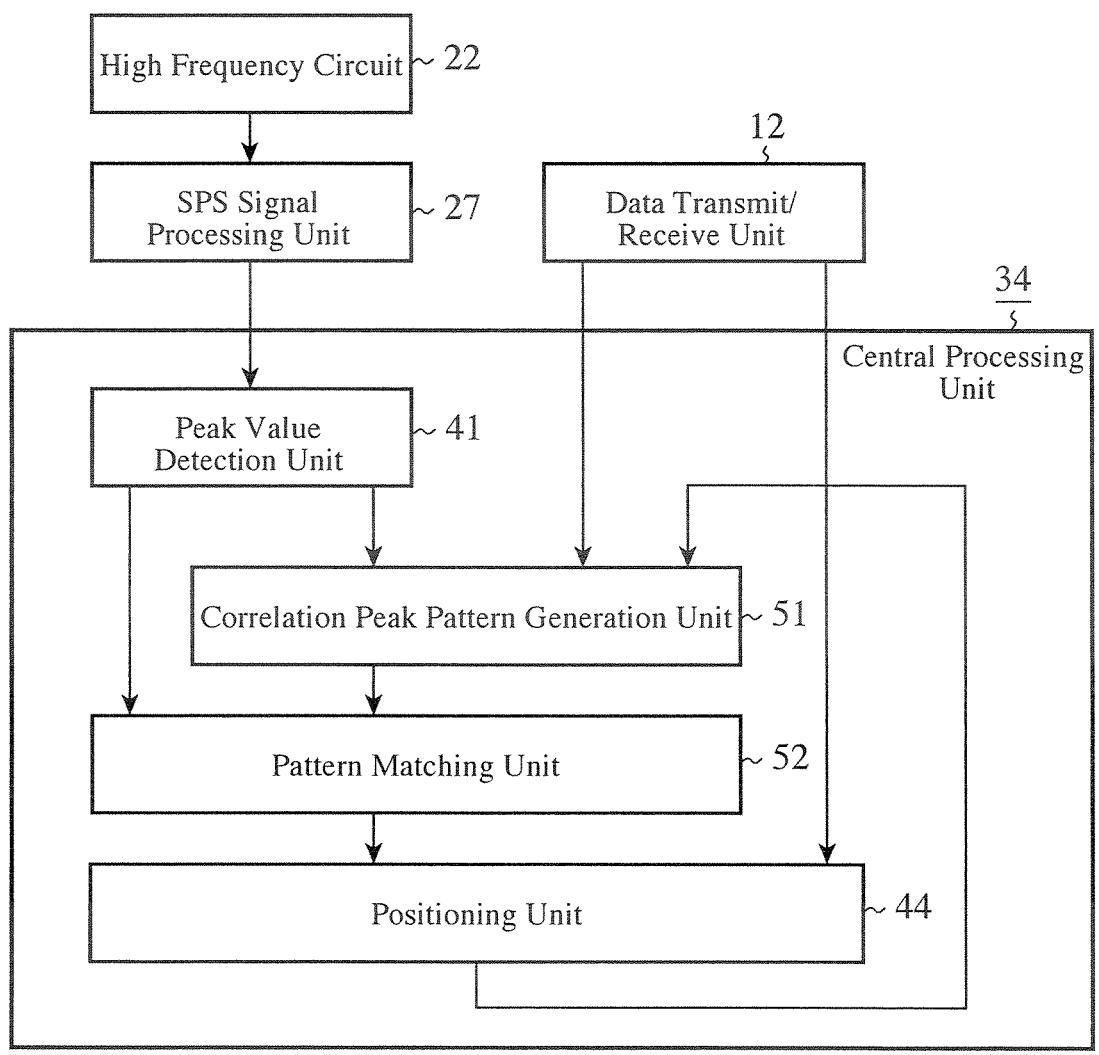
FIG. 11 is a block diagram showing a central processing unit 34 of a positioning apparatus in accordance with embodiment 5 of the present invention.

FIG. 11 is a block diagram showing the central processing unit 34 of a positioning apparatus in accordance with embodiment 5 of the present invention. In the figure, the same reference numerals as shown in FIG. 5 denote the same components or like components, and therefore the explanation of the components will be omitted hereafter.

When two or more peak values are detected by the peak value detection unit 41, a correlation peak pattern generation unit 51 of the central processing unit 34 generates a correlation peak pattern on the basis of the pseudo distance PR1 between the satellite 1 and the SPS reference station 4, and the pseudo distance PR2 between the satellite 2 and the SPS reference station 4.

A pattern matching unit 52 of the central processing unit 34 carries out pattern matching of each peak value detected by the peak value detection unit 41 with the correlation peak pattern generated by the correlation peak pattern generation unit 51, and detects a peak value which matches with the correlation peak pattern mostly from among the peak values detected by the peak value detection unit 41.

Next, the operation of the positioning apparatus in accordance with this embodiment of the present invention will be explained.

Because the operations of those other than the central processing unit 34 are the same as those of either of above-mentioned embodiments 1 to 4, only the operation of the central processing unit 34 will be explained hereafter.

Figure 12:
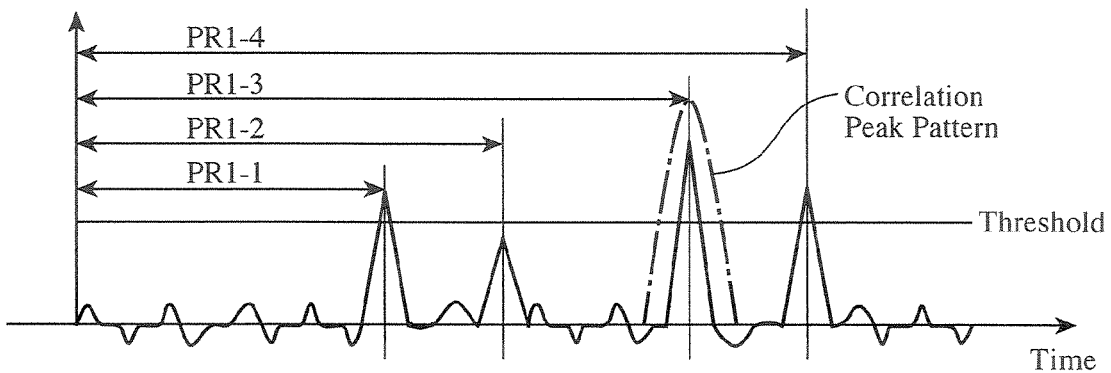
FIG. 12 is an explanatory diagram showing a pattern matching between a correlation peak pattern and a correlation value.

When receiving a correlation value which falls within each effective range from the post-processing unit 31 of the SPS signal processing unit 27, the peak value detection unit 41 of the central processing unit 34 compares the correlation value with a given threshold which is set up beforehand, and detects, as a peak value, a correlation value larger than the threshold, as shown in FIG. 12.

In the example of FIG. 12, the peak value detection unit 41 detects three peak values.

When two or more peak values are detected by the peak value detection unit 41, the correlation peak pattern generation unit 51 of the central processing unit 34 generates a correlation peak pattern on the basis of the pseudo distance PR1 between the satellite 1 and the SPS reference station 4 and the pseudo distance PR2 between the satellite 2 and the SPS reference station 4.

A method of generating a correlation peak pattern is not limited to a specific one, and, for example, a method disclosed by the following nonpatent reference can be used.

Nonpatent Reference

J. B. Y. Tsui, Fundamentals of Global Positioning System Receivers A Software Approach, John Wiley & Sons, Inc. 2000, Canada pp. 78-83

When the correlation peak pattern generation unit 51 generates a correlation peak pattern, the pattern matching unit 52 of the central processing unit 34 carries out pattern matching of the correlation peak pattern with each peak value detected by the peak value detection unit 41, and detects a peak value which matches with the correlation peak pattern mostly from among the peak values detected by the peak value detection unit 41.

The method of generating a correlation peak pattern is not limited to a specific one, and, for example, the method disclosed by the above-mentioned nonpatent reference can be used.

When the pattern matching unit 52 detects the peak value which matches with the correlation peak pattern mostly, the positioning unit 44 of the central processing unit 34 determines the current position from the peak value.

As can be seen from the above description, the positioning apparatus in accordance with this embodiment 5 generates a correlation peak pattern on the basis of the pseudo distance between each of the satellites 1 and 2 and the reference station 4, and detects the peak value which matches with the correlation peak pattern mostly from among the peak values of the correlation values outputted from the SPS signal processing unit 27. Therefore, the present embodiment offers an advantage of being able to determine the current position correctly even under a receiving environment in which the electric waves which come directly from the satellites 1 and 2 become weak.

Embodiment 6

Figure 13:
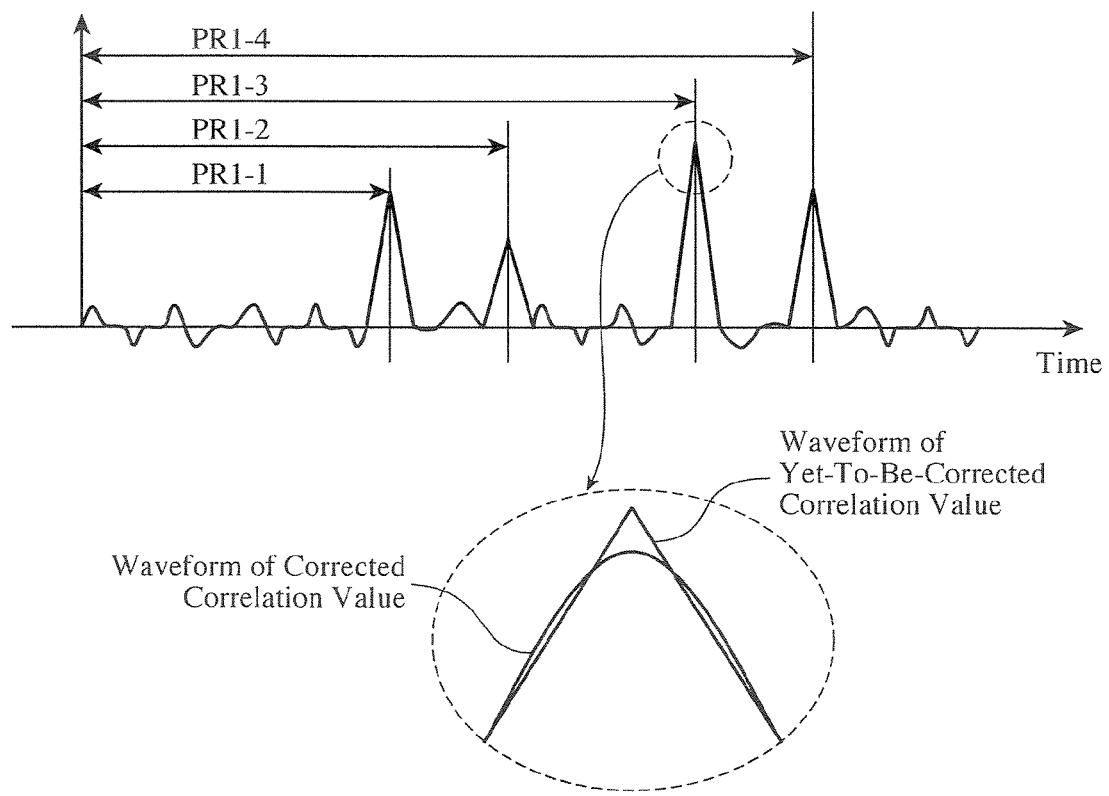
FIG. 13 is an explanatory diagram showing a correction process of correcting a peak value detected by a peak value detection unit 41.

In accordance with above-mentioned embodiment 5, the pattern matching unit 52 of the central processing unit 34 carries out pattern matching of the correlation peak pattern generated by the correlation peak pattern generation unit 51 with each peak value detected by the peak value detection unit 41, as previously shown. As shown in FIG. 13, the pattern matching unit 52 can correct each peak value detected by the peak value detection unit 41, and carry out pattern matching of each corrected peak value with the correlation peak pattern generated by the correlation peak pattern generation unit 51.

More specifically, when receiving each peak value detected by the peak value detection unit 41, the pattern matching unit 52 corrects each peak value by substituting each peak value and values before and behind each peak value into, for example, an approximate expression of a nonlinear function.

FIG. 13 shows the waveforms of a correlation value which is yet to be corrected and the correlation value which is corrected. The correlation value which is yet to be corrected has a triangular waveform, and it somewhat differs from the waveform (an angular waveform) of the correlation peak pattern generated by the correlation peak pattern generation unit 51.

However, the corrected correlation value has an angular waveform, and it is similar to the waveform (an angular waveform) of the correlation peak pattern generated by the correlation peak pattern generation unit 51.

As a result, because the matching accuracy of the pattern matching is improved, the accuracy of the current position can be improved.

INDUSTRIAL APPLICABILITY

As mentioned above, the positioning apparatus in accordance with the present invention is suitable for a case in which electric waves sent from satellites are received, and, when determining the current position, it is necessary to implement high-precision positioning even under a receiving environment of a weak electric field.

The invention claimed is:

1. A positioning apparatus comprising:
    a first radio wave receiving means for receiving electric waves sent from satellites;
    a second radio wave receiving means for receiving pseudo distances between said satellites and a reference station;
    a correlation value output means for calculating correlations between pseudo pattern codes of said satellites and the electric waves received by said first radio wave receiving means, and for outputting correlation values indicating the correlations;
    a peak value detection means
        for setting up an effective range for each of the correlation values outputted from said correlation value output means on a basis of a pseudo distance between said satellites and said reference station, and
        for detecting a peak value which falls within the effective range based on a difference between the pseudo distances received by the second radio wave receiving means; and
    a positioning means for determining a current position from peak values detected by said peak value detection means.

2. The positioning apparatus according to claim 1, wherein the second radio wave receiving means receives the pseudo distance between each of the satellites and the reference station from the reference station.

3. The positioning apparatus according to claim 1, wherein the peak value detection means compares each of the correlation values outputted from the correlation value output means with a predetermined threshold so as to detect, as the peak value, a correlation value which is larger than the threshold.

4. The positioning apparatus according to claim 3, wherein when two or more peak values exist within the effective range, the peak value detection means changes the threshold and detects a largest peak value from the two or more peak values.

5. The positioning apparatus according to claim 1, wherein when two or more peak values exist within the effective range, the peak value detection means selects a peak value which corresponds to a pseudo distance difference between the two or more satellites.

6. The positioning apparatus according to claim 5, wherein the second radio wave receiving means receives the pseudo distance difference between the two or more satellites from the reference station.

7. The positioning apparatus according to claim 1, wherein said apparatus includes a change receiving means for receiving a change in the effective range set up by the peak value detection means.

8. The positioning apparatus according to claim 1, wherein the peak value detection means defines, as parameters, the pseudo distance between each of the satellites and the reference station, and a pseudo distance which is based on a detection candidate's peak value, and substitutes them into an evaluation equation, changes the parameters until the evaluation equation is established, and detects the peak value which falls within the effective range.

9. The positioning apparatus according to claim 1, wherein the peak value detection means calculates a threshold from each of the correlation values outputted from the correlation value output means, and detects, as the peak value, a correlation value which is larger than the threshold.

10. The positioning apparatus according to claim 1, wherein the correlation value output means adds a received signal indicating an electric wave received by the radio wave receiving means for every period of each of the pseudo pattern codes, calculates a correlation between the received signal on which the addition process has been performed, and each of the pseudo pattern codes, and adds a correlation value indicating the correlation for every data modulation period.

11. The positioning apparatus according to claim 1, wherein when receiving an electric wave sent from a satellite, the radio wave receiving means detects a frequency error of the electric wave which is caused by a Doppler phenomenon and compensates for the frequency error of the electric wave.

12. The positioning apparatus according to claim 1, wherein when detecting the peak value which falls within the effective range, the peak value detection means detects the peak value in consideration of the current position which was determined for a last time by the positioning means.

13. A positioning apparatus comprising:
    a first radio wave receiving means for receiving electric waves sent from satellites;
    a second radio wave receiving means for receiving pseudo distances between said satellites and a reference station;
    a correlation value output means for calculating a correlation between each of pseudo pattern codes of said satellites and the electric waves received by said first radio wave receiving means, and for outputting a correlation value indicating the correlation;
    a peak value detection means
        for generating a correlation peak pattern on a basis of a pseudo distance between said satellites and said reference station, and
        for detecting a peak value which falls within the correlation peak pattern based on a difference between the pseudo distances received by the second radio wave receiving means; and
    a positioning means for determining a current position from the peak value detected by said peak value detection means.

14. The positioning apparatus according to claim 13, wherein when detecting the peak value which falls within the correlation peak pattern, the peak value detection means corrects the peak value using the peak values of the correlation values outputted from the correlation value output means, and values which are before and after the peak values.

15. A positioning apparatus comprising:
    a first radio wave receiver configured to receive electric waves sent from satellites;
    a second radio wave receiver configured to receive pseudo distances between said satellites and a reference station;
    a correlation value output unit configured to calculate correlations between pseudo pattern codes of said satellites and the electric waves received by said first radio wave receiver, and to output correlation values indicating the correlations;

a peak value detection unit configured
- to set up an effective range for each of the correlation values outputted from said correlation value output unit on a basis of a pseudo distance between said satellites and a reference station, and
- to detect a peak value which falls within the effective range based on a difference between the pseudo distances received by the second radio wave receiver; and a positioning unit configured to determine a current position from peak values detected by said peak value detection unit.

* * * * *